June 19, 1934.  P. B. REEVES  1,963,807
VARIABLE SPEED UNIT
Filed Nov. 21, 1930   2 Sheets-Sheet 1

INVENTOR.
Paul B. Reeves,
BY
Hood + Hahn.
ATTORNEYS

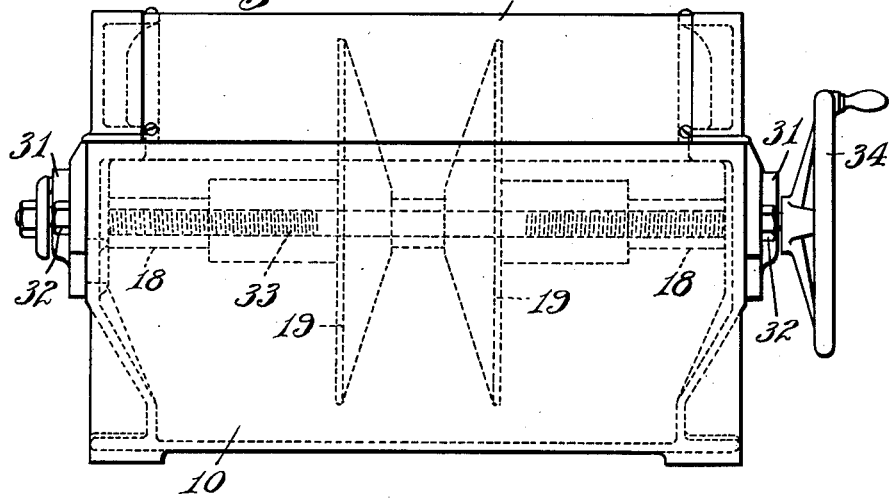

Patented June 19, 1934

1,963,807

UNITED STATES PATENT OFFICE 1,963,807

VARIABLE SPEED UNIT

Paul B. Reeves, Columbus, Ind., assignor to Reeves Pulley Company, Columbus, Ind., a corporation of Indiana Application November 21, 1930, Serial No. 497,258

5 Claims. (Cl. 64—8)

The object of my invention is to provide an improved frame and assembly structure for that type of speed varying mechanisms which, for many years, has been commonly designated in the trade as the Reeves transmission.

In these constructions heretofore the rotating parts have been supported by a cast iron frame surrounding the two pairs of cones and the edge-active belt has been, of necessity, of a spliced type in order that the belt may be readily placed or removed for repair.

My present construction, wherein the rotating parts and immediately associated parts are readily removably supported in the main frame without separation of the belt from the cones, makes possible a very compact structure which may be entirely enclosed and also makes possible the use of an edge-active belt which is truly endless without a separable splice.

Figure 1:
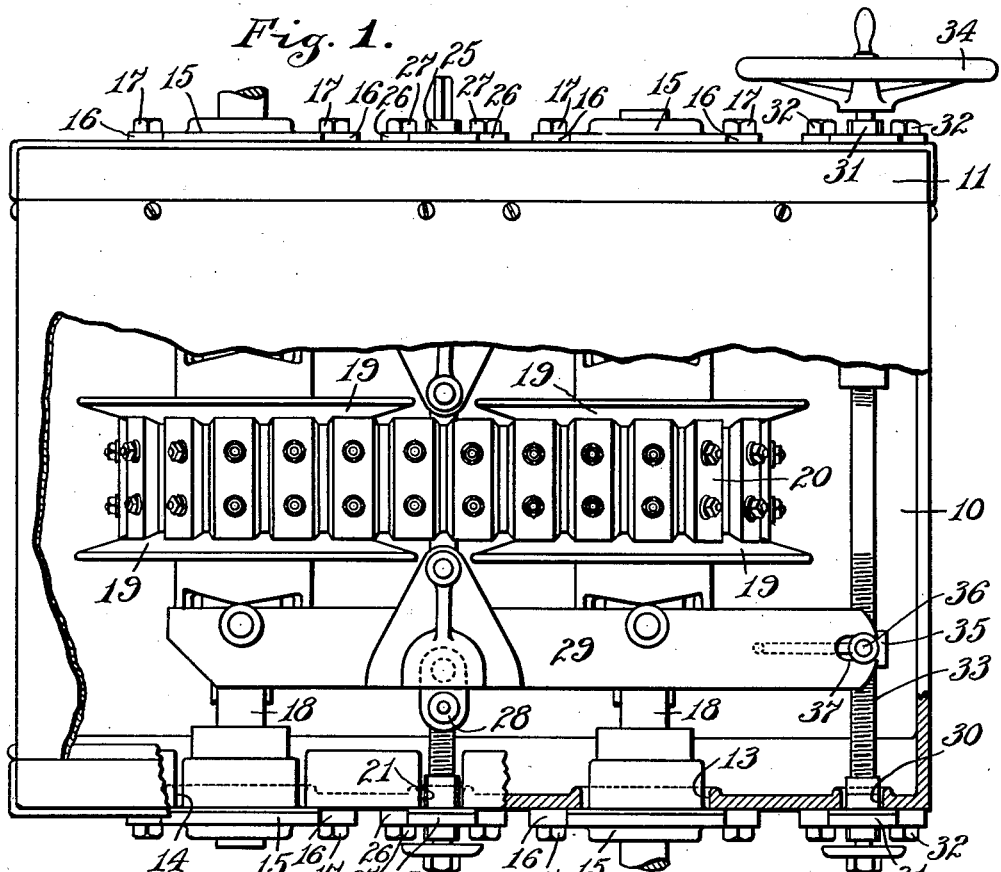
Figure 2:
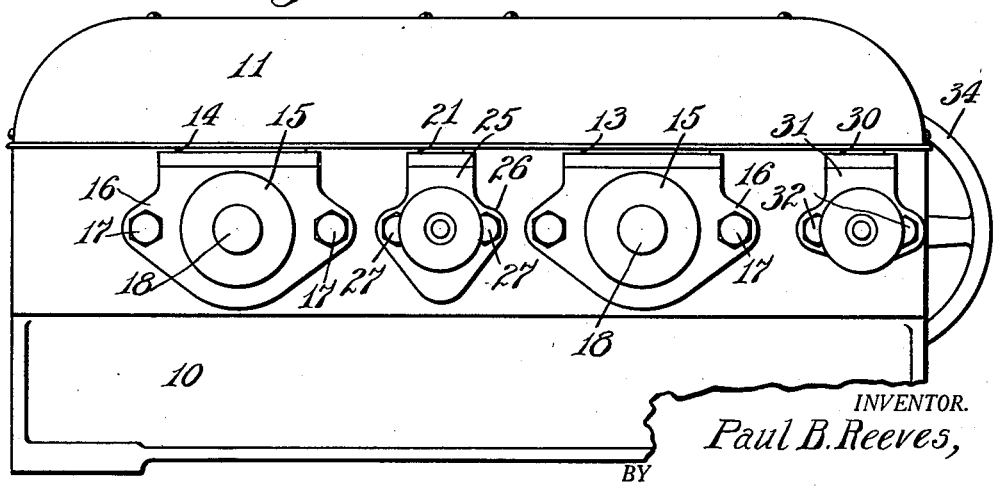

The accompanying drawings illustrate my invention:

Fig. 1 is a plan, in partial horizontal section, of a structure embodying my invention; Fig. 2 is a side elevation; and Fig. 3 is an end elevation.

In the drawings 10 is a main frame with an associated removable cover 11.

Each side bar of frame 10, at its upper edge, is notched at 13 and 14 for the reception of bearing blocks 15 each of which is conveniently provided with laterally extending ears 16 detachably secured to the outer face of the side bar by bolts 17. Journaled in the bearing blocks 15 are the two shafts 18, 18, upon which are splined the cone pairs 19, 19 between which extends an endless preferably integral edge-active belt 20.

Between the notches 13 and 14 the upper edge of each side bar of frame 10 is notched at 21 for the reception of blocks 25, each provided with laterally extending ears 26, which are detachably secured to the side bar by bolts 27. Each of these blocks 25 supports adjustable fulcrum mechanism 28, of well-known form, which supports levers 29 arranged to act upon the cone-pairs 19 to laterally position the same for desired speed ratios.

A notch 30 is likewise formed in each of the side bars of frame 10 near one end for the reception of blocks 31 secured to said frame members by bolts 32, and forming bearings for the opposite ends of an adjusting screw 33 which shaft carries a hand wheel 34 or other manipulating element. Nuts 35 threaded on screw 33 carry pins 36 which lie in open ended slots 37 in levers 29.

Apparatus of this type, when constructed in the manner described, comprises six units, i. e., (1) The frame (2), (3) Two cone-pairs, each consisting of a shaft, two cones splined on the shaft, and the supporting bearings for the shaft, (4) The lever unit, comprising the pressure levers acting on the cone pairs, the fulcrum blocks for these levers, a screw rod and guide rods for the fulcrum blocks, and the supports for these rods (5) The belt (6) The lever shifting unit, comprising the blocks engaging the pressure levers, the screw rod carrying these blocks, and the supports for this rod. The connection between pins 36 and levers 29 is preferably the open ended slots 37 so that the levers may be separated from the pins without removal of this lever-shifting unit from the frame if desired. The units (2), (3), (4) are loosely associated when not supported in the frame.

In order to remove or replace an endless belt the units (2), (3) and (4), with or without unit (5) may be lifted from the frame, unit (1), due to the open ended slots in the frame, whereupon the cone shafts may be brought close enough together with unit (4) in the middle, to permit removal or placement of the belt.

The use of a permanently-endless edge-active belt is decidedly advantageous because such a belt may be so formed as to be balanced throughout, whereas it is practically impossible to avoid a heavy unbalanced spot in a spliced belt.

I claim as my invention:

1. A variable-speed transmission unit of the cone-pairs-edge-active-belt type comprising, a main frame, two cone-carrying shafts, bearings for supporting said shafts, a fulcrum-carrying shaft arranged between the cone-shafts, supports for said fulcrum-carrying shaft, cone-actuating levers supported on said fulcrum shaft, and an edge-active-belt encompassing the cones and fulcrum shaft, the main frame being provided with upwardly-opening slots in its walls receiving said shaft bearings whereby all of said shafts with their supported elements may be laterally extracted from the main frame without previous removal of the belt.

2. A variable-speed transmission unit of the cone-pairs-edge-active-belt type comprising, a main frame, two cone-carrying shafts, bearings for supporting said shafts, a fulcrum-carrying shaft arranged between the cone-shafts, supports for said fulcrum-carrying shaft, cone-actuating levers supported on said fulcrum shaft and loosely associated with said cones, and a continuous edge-active-belt encompassing the cones and fulcrum shaft, the main frame having its upper edge formed with open slots for the reception of the shaft bearings whereby all of said shafts may be laterally extracted from the main frame without previous removal of the belt, and whereby, after such extraction, said cone-carrying shafts may be moved toward each other to permit removal of said continuous belt, without further disassembly of said unit.

3. A variable-speed transmission unit of the cone-pairs-edge-active-belt type comprising, a main frame, two cone-carrying shafts, bearings for supporting said shafts, a fulcrum-carrying shaft arranged between the cone-shafts, supports for said fulcrum-carrying shaft, cone-actuating levers supported on said fulcrum shaft, an edge-active-belt encompassing the cones and fulcrum shaft, a lever manipulating screw carrying nuts loosely engaging said levers, and bearings for said screw, said shaft bearings and screw bearings being received in upwardly opening slots in said main frame, whereby all of said shafts and said screw, with their supported elements, may be laterally extracted from the main frame without previous removal of the belt, and without disassembly of any other element of the transmission.

4. A variable-speed transmission unit of the cone-pairs-edge-active-belt type comprising, a main frame, two cone-carrying shafts, bearings for supporting said shafts, a fulcrum-carrying shaft arranged between the cone shafts, supports for said fulcrum-carrying shaft, cone-actuating levers supported on said fulcrum shaft, an edge-active belt encompassing the cones and fulcrum shaft, a lever manipulating screw carrying nuts engaging said levers, and bearings for said screw, the main frame having its upper edge formed with open slots for the reception of the shaft bearings and screw bearings whereby all of said shafts and the screw may be laterally extracted from the main frame without previous removal of the belt, and individual means for respectively securing said bearings in place in said slots.

5. The combination with a variable speed unit comprising a pair of spaced parallel shafts, a pair of cones slidably mounted on each of said shafts with their apices in facing relation, operating means for said cones comprising an adjusting shaft located between said cone-carrying shafts, a second adjusting shaft located at one end of said unit and mounted in said frame, linkages operatively connecting said adjusting shafts to move said cones, and an edge-active endless one piece belt operatively mounted on said cones, of a frame, bearing blocks for each end of each of said cone-carrying shafts, and bearing blocks for each end of said first mentioned adjusting shaft, said frame being formed in its upper edge with upwardly opening notches each adapted to receive one of said bearing blocks, and removable means securing each of said bearing blocks to said frame with their shafts in their respective notches.

PAUL B. REEVES.